J. L. GISH.
SANITARY FLUSHING TANK.
APPLICATION FILED AUG. 10, 1912.
1,074,711.
Patented Oct. 7, 1913.
2 SHEETS—SHEET 1.
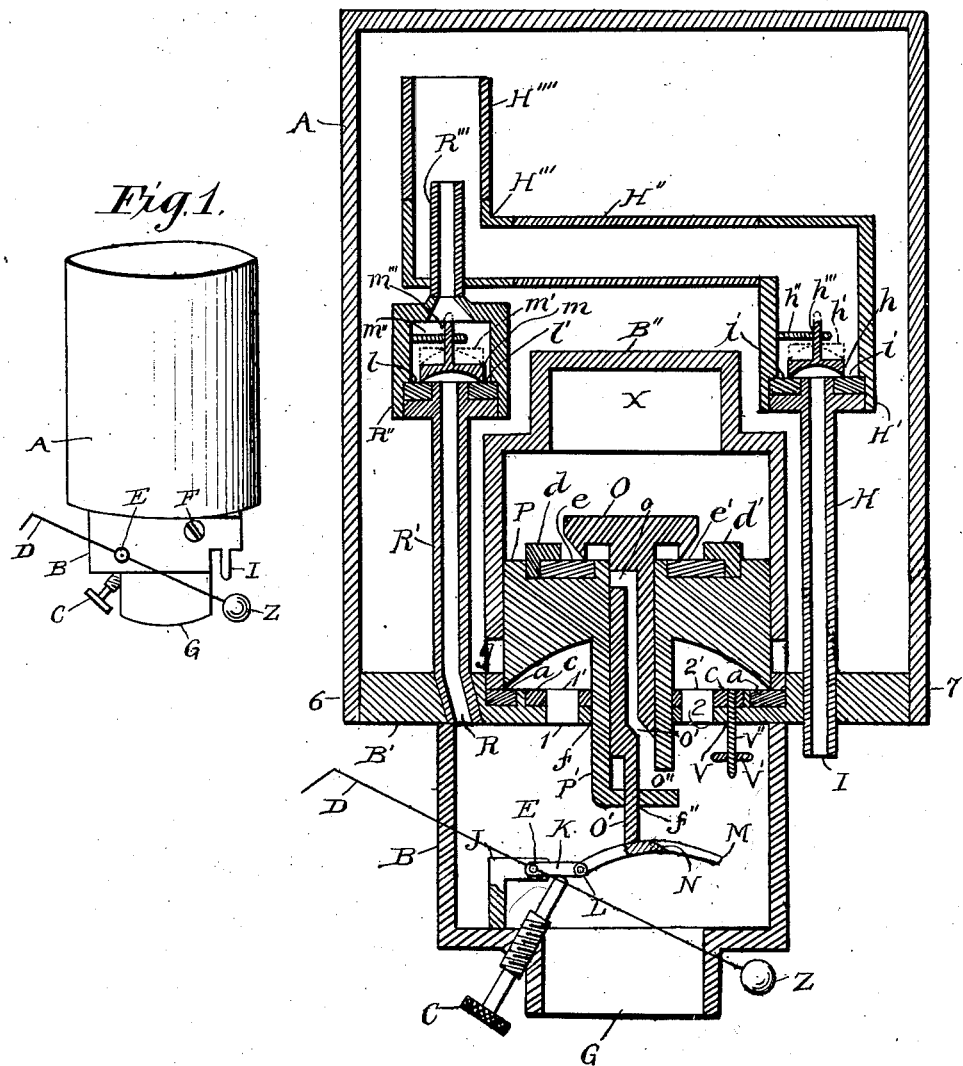

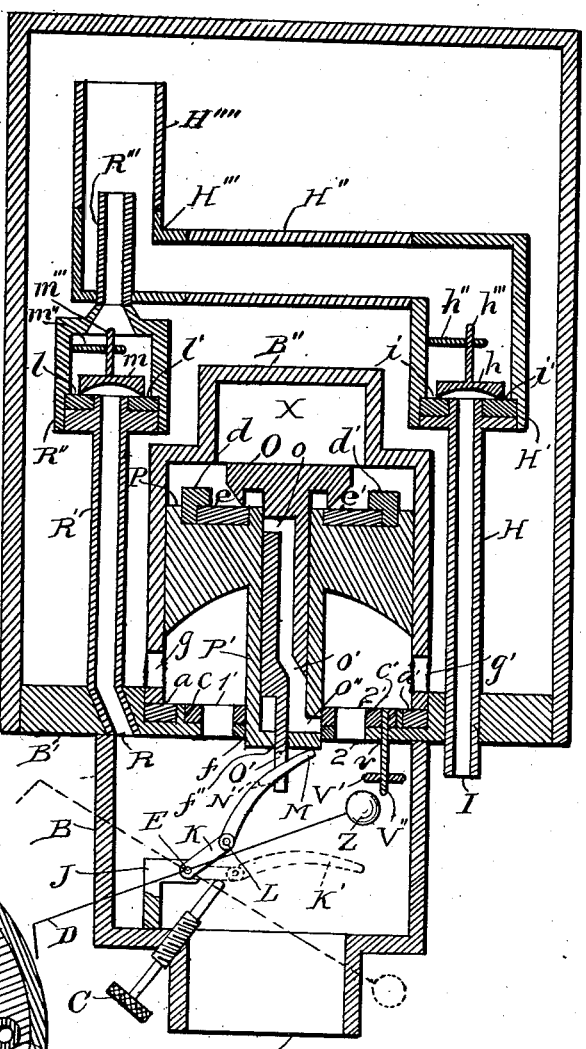

UNITED STATES PATENT OFFICE.

JOHN LINCOLN GISH, OF SOUTH BEND, INDIANA.

SANITARY FLUSHING-TANK.

1,074,711.  Specification of Letters Patent.  Patented Oct. 7, 1913.

Application filed August 10, 1912. Serial No. 714,488.

*To all whom it may concern:*

Be it known that I, JOHN LINCOLN GISH, a citizen of the United States, residing at South Bend, in the county of St. Joseph and State of Indiana, have invented a new and useful Sanitary Flushing-Tank, of which the following is a specification.

The object of my present invention, is to construct a sanitary flushing tank, in such a manner; firstly, that the fluid in the tank, will be retained, under direct pressure, in said tank, until said fluid is required for flushing; secondly, that the fluid in the tank, will be discharged under direct pressure; thirdly, that the flushing stream will be under perfect control; fourthly, after the flushing has been completed, for the regulated self closing valve, to be closed automatically; fifthly, to restore the required amount of air and water, necessary for a successful flushing, thereby leaving the device ready to repeat, its work, as hereinafter described.

Figure 1, is a perspective of my improved apparatus. Fig. 2 is a vertical section thereof, showing relation of parts, with the respective valves, P, O, $h$, and $m$, in their closed position. Fig. 2, also shows, relation of parts, with the valves P, and O, in their closed position, and the valves $h$ and $m$, in the open position, as indicated by the dotted lines, $h'$, and $m'$. Fig. 3, is a vertical section thereof, showing relation of parts, with the valve P, in the open position, and the respective valves, O, $h$, and $m$, in their closed position. Fig. 3, also shows, relation of parts, with the valve P, in the open position, and the valves O, $h$, and $m$, in their closed position, with the operating finger K, returned to its starting position, as indicated by the dotted lines $K'$. Fig. 4, is a cross section thereof, on the line 6, and 7, Fig. 2, with the depending valve-stem $P'$, the regulating plate $c$, $c'$, and the screw-arm F, removed. Fig. 5, is the regulating plate $c$, $c'$. Fig. 6, is a vertical section of the screw-arm F, showing the flexible stem $V'$, also the pin $V''$, and that part of plate $c$, $c'$, which secures, the upper part, of the said pin $V''$. Fig. 7, is a cross section of my device, on the line 6, and 7, Fig. 2, with the regulating plate $c$, $c'$, and the screw-arm F, in their respective positions; with, the depending valve-stem $P'$, removed.

In the drawings, self closing valves, of the reciprocating type, are shown.

Like letters of reference, refer to like parts, in the several figures.

In Fig. 1, A, is the tank, fastened fluid tight, to the removable valve-casing B. I, is the inlet, leading into the tank A; B, is the valve-casing: D, is a handle: Z, is a counter-balance to the handle D: E, is an operating spindle, which passes into the valve-casing B. The handle D, is securely fastened to the spindle E: C, is an adjustable screw, passing into the valve-casing B: F, is a screw-arm, passing into the valve-casing B: G, is the outlet to the valve-casing B. The usual connections with the service pipe and the discharge pipe, are made at I, and G, respectively.

In Fig. 2, J, is a supporting arm, for the spindle E. E, is an operating spindle, to which is firmly fixed the finger K: L, is a rule-joint, in the finger K. M, is a slot in the finger K: N, is a depressed curved surface, forming the heel of the slot M. $O'$, is the apertured valve-stem, to the valve O. $o$, $o'$, is the passage-way, through the stem $O'$. O, is the relief valve, to the chamber X. $e$, $e'$, is the valve-seat, for valve O. $d$, $d'$, is a plate of a suitable nature, to firmly fix the valve-seat $e$, $e'$, into its place. P, is the main operating valve. $P'$, is the depending valve-stem, to the valve P. $o''$, is is an opening, in the side, near the distal end, of said valve-stem $P'$. $b$, is an opening in the valve-casing, part $B'$, through which the valve-stem $P'$, passes, entirely filling the aperture, through which it passes. $a$, $a'$, is the valve-seat, for the valve P. $c$, $c'$, is the regulating plate, to control the flushing stream: $1'$, and $2'$, are openings in the plate $c$, $c'$. $V''$, is a pin firmly fixed in the plate $c$, $c'$, and projecting downward through slot $v$, movably engages $V'$: $V'$, is the movable flexible arm engaged, within the screw-arm F, Fig. 8.

1, and 2, are openings in the valve-casing, part $B'$, and correspond, with the $1'$, and $2'$, openings, in the plate $c$, $c'$: $g$, $g'$, are openings, in the valve-casing, part $B''$. X, is a confined chamber, within the valve-casing, part $B''$, and above the main valve P. B, $B'$, $B''$, form the different parts of the valve-casing, fastened fluid tight, to each other. H, is the intake pipe, for water. $H'$, is a valve-casing; $h$, is a check valve, within said valve-casing $H'$; $i$, $i$, is the valve-seat, for valve $h$; $h'''$, is a valve-stem for valve $h$; $h''$, is a supporting arm, for stem, $h'''$; $h'$, is the dotted lines, showing, when the valve h, is in the open position. H'', is a conduit or tube, leading from valve-casing H', to the elbow H'''; the elbow H''', forms the continuous passage-way onward, to the pipe or tube H''''. H''''', is the intake pipe, opening into the said tank A. R, is the inlet, to the pipe R'. R', is the intake pipe, for air. R'', is a valve-casing; m, is an air valve, within said valve-casing R''; l, l', is the valve seat, for valve, m. m''', is a valve-stem, for valve m; m'', is a supporting arm, for stem, m'''; m', is the dotted lines, showing, when the valve m, is in the open position. R''', is a pipe leading from the valve-casing R'', passing through, a fluid tight opening, in the elbow H''', and ending within the pipe H''''.

In Fig. 4, v, is the slot in which the pin V''', slides or moves, as the plate c, c', is rotated upon its axis. 1, 2, 3, and 4, are openings in the valve-casing, part B', for the passing of the flushing stream; b, is the opening which engages the valve-stem P'; H, is the intake pipe for water; R', is the intake pipe for air.

In Fig. 5, 1', 2', 3', 4', are openings in the regulating plate c, c', corresponding to openings, 1, 2, 3, 4, in the valve-casing, part B'; b', also corresponds to the opening b, in the valve-casing, part B'; V''', is the pin, firmly fixed, in the plate c, c'.

In Fig. 6, F, is the screw-arm; V', is a movable flexible arm, one end of which is movably secured, admitting of rotation, within the screw-arm F, the other end of arm V', movably engages the pin V''', which is firmly fixed to the regulating plate c, c'.

In Fig. 7, the regulating plate c, c', and the screw-arm F, are in place, showing, the openings, 1, 2, 3, 4 intersected by the openings 1', 2', 3', 4'.

The special features of my device are described as follows,—The valve-casing B, B', B'', is provided with inlet and outlet openings, to allow a flushing stream to pass through said valve-casing. The valve-casing, part B'', incloses a main valve P, and a relief valve O. The said main valve P, is a gravity actuated valve, with a smooth, plain, perpendicular surface, fitting into the said valve-casing, part B'', in such a manner, as to form a confined chamber X, within said valve-casing, part B'', above the said main valve P. The said main valve P, has a gasket e, e', secured to its upper surface, by means of the plate d, d', forming a pliable seat, for the relief valve O. The said main valve P, has a concave bottom, forming a thin cutting edge, which contacts the valve-seat a, a', forming a positive closure. The said main valve P, has a depending valve-stem P'. The said main valve P, and its depending valve-stem P', are provided with a continuous axial passage-way, extending their full length. The said depending valve-stem P', is also provided, near its lowest end, with a side opening o''. The said relief valve O, has an apertured valve-stem O', projecting through the central axis of said main valve P, entirely filling the aperture through which it passes. The projected end, of the apertured valve-stem O', after passing the said main valve P, is housed within the depending valve-stem P', in such a manner, so as to admit of a continuous passage-way, between, opening o', and opening o''. The distal end of the apertured valve-stem O', projects through the distal end, of the depending valve-stem P', entirely filling the opening, at its exit b'', thereby giving proper alinement and support, to the distal end, of the said valve-stem O'.

The flushing stream is controlled, by the circular regulating plate c, c', actuated by the screw-arm F. The said plate c, c', is provided with openings, 1', 2', 3', 4', see Fig. 5, corresponding to openings, 1, 2, 3, 4, in the valve-casing, part B', see Fig. 7. The said screw-arm F, is provided with a flexible, movable arm V', one end of which movably engages the pin V''', on the plate c, c', while the other end, of the arm V', is movably secured, admitting of rotation, within the screw-arm F, see Fig. 6. By turning the screw-arm F, to the right, a corresponding pressure is given to the arm V', which pushes upon the pin V''', on the regulating plate c, c', causing the said regulating plate c, c', to rotate upon its axis, from, its starting position, and presenting the openings, 1', 2', 3', 4', in the plate c, c', to the openings, 1, 2, 3, 4, in the valve-casing, part B'. When the openings, 1', 2', 3', 4', in the plate c, c', fully correspond, to the openings, 1, 2, 3, 4, in the valve-casing, part B', see Fig. 2, we have the maximum flushing stream. By turning the screw-arm F, to the left, we reverse the action, and rotate the plate c, c', upon its axis, toward, its starting position, thereby causing the openings, 1', 2', 3', 4', in the regulating plate c, c', to intersect, the openings, 1, 2, 3, 4, in the valve-casing, part B', and correspondingly decrease the size of the said openings, see Fig. 7. By turning the screw-arm F, to the right or to the left, thereby changing the size of the said openings, we control the fluid, required for a successful flushing.

The feature of the operating means, is the slot M, in the finger K, whereby the relief valve O, is allowed to close, while the finger K, still holds the main valve P, in the open position, see Fig. 3. The rule-joint L, in the finger K, may be used, to allow the said finger K, to swing in one direction, when the operating means, is returned to its starting position, before closure of said main valve P; but the heel of the slot, see N, Fig. 3, may be so formed, that the rule-joint L, is not necessary, for the operating means, to be returned, to its starting position, before closure of said main valve P.

The refilling of the tank A, with the required amount of air and water, necessary for a successful flushing, is a feature; and this "refilling" of said tank A, is accomplished as follows,—water is allowed to flow, into said tank A, by way of the inlet opening I. As the water, under pressure, flows past the check-valve $h$, raising said check-valve $h$, to position of dotted line $h'$, Fig. 2, the water is conducted through the pipe H″, and delivered to the elbow H‴; at this point the water encircles a pipe R‴; and as the water is forced, onward, under pressure, past the pipe R‴, a suction or aspirator action is created, at the end of the pipe R‴, thereby opening the intake air valve $m$, to the position, $m'$, as indicated by the dotted line, Fig. 2, and allowing the required amount of air, to enter, by way of the inlet R, and the pipe R′, and mix with the water, in the pipe H⁗, to be delivered to the inside of said tank A. This aspirator action of air, into said tank A, actuated by, and simultaneously with, the intake of water, assures the required amount of air, necessary for a successful flushing, from said tank A, by the time, the said tank A, has received its required amount of water. As soon as the air and water pressure, within the tank A, equals the water pressure in the service pipe, the said air-valve $m$, and the said check-valve $h$, will be closed, automatically, as shown in Fig. 2, and prevent the contents of said tank A, from escaping by way of the respective, intake pipes, R′, and H.

With the special features thus described, my device operates as follows:—In Fig. 2, all valves are in the closed position; as soon as water is allowed to pass the inlet opening I, the check-valve $h$, by the action of the water, is opened to the position $h'$, as indicated by the dotted line, Fig. 2. Water passing the check-valve $h$, flows onward through the pipe H″, and is delivered to the elbow H‴, where the water encircles the pipe R‴; as the water, under pressure, is forced onward, past the end, of pipe R‴, a suction or aspiration is created, at the end of pipe R‴, and thereby the air-valve $m$, is elevated to the open position, $m'$, as indicated by dotted line, Fig. 2. With the check-valve $h$, and the air-valve $m$, in the open position, as indicated by the dotted lines, $m'$, and $h'$, Fig. 2, air is drawn through the pipe R‴, and mixed with the intake of water, within the pipe H⁗, and delivered to the inside of said tank A. Water will continue to flow, into said tank A, until the air and water pressure therein, equals the pressure of the water in the service pipe, at which point, both the air valve $m$, and the check-valve $h$, will be closed, automatically, and present relation of parts, as shown in Fig. 2. As the said tank A, is filled with air and water, a corresponding pressure is forced between the inner wall of said valve-casing, part B″, and the outer wall of the said main valve P, into the confined chamber X, thereby forcing the said relief valve O, and the said main valve P, downward, upon their respective valve-seats, and forming a positive closure of said valves, O, and P. With the said tank A, filled to its capacity, a downward motion of the handle D, will rotate the spindle E, upon its axis, and elevate the finger K, which delivers a corresponding pressure upon the end, of the apertured valve-stem O′, thereby opening the relief valve O, Fig. 3, and allowing the contents of chamber X, to be discharged through the apertured valve-stem O′, into the housing, within the depending valve-stem P′, and onward through the opening $o''$, to be delivered to the discharge pipe G. With the pressure of air and water, in the confined chamber X, released by way of the passage-way $o$, $o'$, within the valve-stem O′, a continued downward pressure upon the handle D, will deliver a corresponding pressure, by means of finger K, upon the end of the depending valve-stem, P′, and thereby open the said main valve P, see Fig. 3, and allow the contents of said tank A, to be discharged, under direct pressure, through the openings, $g$, $g'$, in the valve-casing, part B″, to the openings, 1′, 2′, 3′, 4′, in the regulating plate $c$, $c'$, and their corresponding openings, 1, 2, 3, 4, in the valve-casing, part B′, and onward to the discharge pipe G. As the main valve P, is fully opened, see Fig. 3, the depending valve-stem P′, changes its position, on the finger K, and presents the distal end, of the apertured valve-stem O′, to the slot M, in said finger K, thereby allowing, the distal end, of said apertured valve-stem O′, to fall into the said slot M, with closure of said relief valve O, while the finger K, is still in contact, with the depending valve-stem P′, and holding the said main valve P, in its full open position. As soon as the handle D, is released, the operating means, D, E, K, will return to its starting position, see dotted line, K′, Fig. 5, and leave the relief valve, O, closed, and the main valve, P, open. The main valve P, being a gravity actuated valve, will return to its closed position, and leave the device ready, to repeat its operation, as shown in Fig. 2.

What I do claim as my invention, and desire to secure by Letters Patent is,—

1. In a device of the class described, an air supplying means comprising an intake tube for water, a valve-casing containing a gravity check-valve for water joined to said intake tube for water, a conducting tube projecting in a horizontal line from said valve-casing, said conducting tube joining said valve-casing for water and terminating in a right angle elbow, a mixing and conducting tube for air and water projecting in a perpendicular line from said elbow, said mixing tube joining the said elbow and emptying into the pressure tank; an intake tube for air, said intake tube for air provided with an inlet opening, a valve-casing containing a gravity check-valve for air joined to said intake tube for air, a conducting tube, joined to, and projecting from said valve-casing for air and passing through a fluid-tight opening in the said elbow ends within the said mixing tube; whereby, during the refilling of the pressure tank, air is drawn through the said intake tube for air and mixed with the intake of water within the said mixing tube, as water, under pressure, flows through the said intake tube for water, and whereby, the required amount of air is re-stored to the direct pressure tank, that is needed for a successful reflushing.

2. A closed tank having a base provided with a liquid inlet and a fluid inlet, tubes connected with said inlets and extending into said tank, a flush pipe connected outside of the tank to said base, the fluid inlet pipe having an aspirator at one end within the tank and direct fluid communication with said flush pipe at its other end, the upper end of the liquid inlet pipe being connected by a conduit with said aspirator, and a check valve within the aspirating device to prevent the egress of fluid from said tank.

In testimony whereof I have signed my name, to this specification in the presence of two subscribing witnesses.

JOHN LINCOLN GISH.

Witnesses:
ANNA GISH,
CARL K. GISH.